United States Patent
Berent et al.

(10) Patent No.: US 12,242,005 B2
(45) Date of Patent: Mar. 4, 2025

(54) DETECTION OF BAD DETECTORS AT IDLE STATE

(71) Applicant: KONINKLIJKE PHILIPS N.V., Eindhoven (NL)

(72) Inventors: Inon Berent, Haifa (IL); David Finzi, Haifa (IL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days.

(21) Appl. No.: 17/781,434

(22) PCT Filed: Dec. 13, 2020

(86) PCT No.: PCT/EP2020/085874
§ 371 (c)(1),
(2) Date: Jun. 1, 2022

(87) PCT Pub. No.: WO2021/122399
PCT Pub. Date: Jun. 24, 2021

(65) Prior Publication Data
US 2022/0413171 A1    Dec. 29, 2022

(30) Foreign Application Priority Data
Dec. 16, 2019    (EP) ...................................... 19216517

(51) Int. Cl.
*G01T 7/00*    (2006.01)
*G01T 1/20*    (2006.01)

(52) U.S. Cl.
CPC .............. *G01T 7/00* (2013.01); *G01T 1/2018* (2013.01)

(58) Field of Classification Search
None
See application file for complete search history.

(56) References Cited

U.S. PATENT DOCUMENTS

| | | |
|---|---|---|
| 6,264,365 B1 | 7/2001 | Patch |
| 2008/0034257 A1 | 2/2008 | Hilderscheid |
| 2008/0298541 A1 | 12/2008 | Mattson |
| 2012/0228486 A1 | 9/2012 | Herrmann |
| 2013/0126742 A1 | 5/2013 | Hayun |
| 2016/0306053 A1 | 10/2016 | Steadman Booker |

FOREIGN PATENT DOCUMENTS

| | | |
|---|---|---|
| CN | 105223599 A | 1/2016 |
| CN | 110118990 A | 8/2019 |

OTHER PUBLICATIONS

PCT International Search Report, International application No. PCT/EP2020/085874, Feb. 4, 2021.
Tortajada M. et al., "Image Correction and Reconstruction for Breast Biopsy", Jul. 20, 2008, Digital Mammography; [Lecture Notes in Computer Science], Springer Berlin Heidelberg, Berlin, Heidelberg, pp. 545-552, XP019092131.

*Primary Examiner* — Edwin C Gunberg
(74) *Attorney, Agent, or Firm* — Larry Liberchuk

(57) ABSTRACT

A fault checker system for an X-ray detector, comprising an input interface (IN) for receiving readings acquired by a target detector pixel not exposed to X-radiation. A converter (CV) is configured to convert the readings into a metric. A thresholder (CP) is configured to compare the metric against at least one threshold and, based on the comparing, provide an indication on whether the detector pixel is faulty.

10 Claims, 6 Drawing Sheets

DETECTION OF BAD DETECTORS AT IDLE STATE

FIELD OF THE INVENTION

The invention relates to a fault checker system for an X-ray detector, to a method of fault-checking an X-ray detector, to an imaging arrangement, to a computer program element, and to a computer readable medium.

BACKGROUND OF THE INVENTION

In some X-ray imaging systems ("imager"), such as computed tomography scanners ("CT"), the X-ray detection system comprises typically tens of thousands of detector channels, also known as pixels.

It may happen that channels fail over the lifetime of the CT scanner. Failing channels are sometimes called Bad Detector ("BD") (channels or pixels).

If data acquired at BDs is used in image reconstruction, artifacts may occur.

SUMMARY OF THE INVENTION

There may therefore be a need for improving X-ray imaging. The object of the present invention is solved by the subject matter of the independent claims where further embodiments are incorporated in the dependent claims. It should be noted that the following described aspect of the invention equally applies to the method of fault-checking an X-ray detector, to the imaging arrangement, to the computer program element and to the computer readable medium.

According to a first aspect of the invention there is provided a fault checker system for an X-ray detector, comprising:

an input interface for receiving readings acquired by a target detector pixel not exposed to X-radiation;
a converter configured to perform a conversion operation to convert the readings into a metric; and
a thresholder configured to compare the metric against at least one threshold and, based on the comparing, providing an indication on whether the detector, in particular the target detector pixel, is faulty.

The readings collected from the target pixel during an idle state of the detector represent measurements of noise. Properties of noise, such as its fluctuation, or other noise patterns may be used herein to identify a faulty pixel. The fault may be in the circuitry of the detector, in particular in a channel of the said target detector.

In embodiments, the conversion operation by the convertor includes a normalization operation applied to the readings. This allows making the thresholding, and hence the fault finding, more robust.

In embodiments, the normalization operation relates readings from a group of one or more other pixels, to the readings acquired by the target pixel. This furthers robustness and allows in particular compensating for drift effects.

In embodiments, the group of pixels neighbor the target pixel. However, readings from pixels elsewhere on the detector array may be used. In particular, all remaining pixels may be used or only a part thereof, etc. In embodiments, the target pixel is included in a detector tile, and wherein the neighboring pixels are restricted to the detector tile. This allows for yet better robustness of the fault finding.

In embodiments, the metric is configured to quantify a fluctuation in the acquired readings.

In embodiments, the metric includes any one or more of: i) an estimate of an over-time standard deviation, ii) a sum of absolute differences over time.

In embodiments, the normalization operation includes forming spatial medians for readings in the said group of one or more pixels.

The fault checker may run once or more than once, at times between scans, while the scanner XI is at idle state. The fault checker may run repeatedly (at a relatively high repetition frequencies) quasi-continuously when the imager is in idle state. The fault checker is capable of detecting bad detector pixel.

The "idle state" as used herein is one where there is no X-ray source exposure of the detector. In particular, this can be achieved by switching off the X-ray source from power supply or otherwise disable the X-ray source to not expose the detector to X-radiation. Although of lesser preference herein, the detector may be moved out of the X-ray beam. However, switching off the X-ray source is preferred herein, and in particular keeping it switched off for a preset time between imaging duties. Whilst the X-ray source remains switched off in idle state, the detector itself remains "on", that is, the detector remains powered on whilst the fault checker performs the fault check. The detector remains powered on in the proposed idle state for fault checks so that readings can be generated and provided at the detector's output interface.

If the fault checker identifies a new BD pixel, this BD pixel may be handled before a next clinical scan. The fault checker does not require applying an external signal, such as X-ray.

In embodiments, the fault checker enables detecting faults (failure modes) such as discontinuities situated between the transducer stage (eg, photodiodes) and the digitizing circuit in the detector. Some detector circuitry includes an operation amplifier for a given channel. In embodiments, an effect of an impedance of the transducer stage (eg, photo detector array) on the standard deviation of a bias of an associated operation amplifier is used to detect conductor line discontinuities. The effect may include a measurable noise decrease. However, compromised conductor lines are not the only failure mode that can be found with the proposed fault checker. Other detectable failure modes include shorts which manifest themselves in noise increase.

In embodiments, the fault checker may use available data paths in the imager, in particular in the detector, to collect the readings. No additional circuitry may be required in some embodiments.

With the proposed fault checker operating in idle states, the imager may be kept operational, despite a bad pixel being found. It may not be necessary to trigger a service call out. A fault found may be recorded for each pixel. A service call can still be scheduled in the future whilst the imager remains operational until then. Downtime can be reduced or avoided altogether.

In embodiments, the system may comprise a compensator to compensate for faulty channels during imaging, based on the output by the fault checker that flags up bad pixels. The output of the fault checker may include a data structure such as a table that associates a pixel address with a flag to indicate whether the pixel is bad or not.

The fault checker system may operate fully automatically "in the background" without user intervention and without affecting clinic workflow.

The one or more threshold for a given (target) pixel may be dynamically adapted, that is updated, based on readings from other pixels. In embodiments, the readings used for the normalization may also be used for the threshold adaptation. The threshold updating may be done once up-front, or repeatedly in measurement cycles when new readings are collected. The threshold adaptation may be conditional on certain one or more conditions. For example, if the current metric remains under (or, in embodiments, over) the current threshold, no adaptation is performed in this cycle.

In another aspect, there is provided a method of fault-checking an X-ray detector, comprising the steps of:
receiving readings acquired by a target detector pixel not exposed to X-radiation;
converting the readings into a metric; and
comparing the metric against at least one threshold and, based on the comparing, providing an indication on whether the detector is faulty, in particular that the target pixel is faulty.

In another aspect, there is provided an arrangement, comprising:
an X-ray imaging apparatus; and
the system of any one of the above mentioned embodiments.

In embodiments, at least a part of the system is integrated into a detector module of the X-ray imaging apparatus.

In embodiments, the imaging apparatus is a medical X-ray imaging apparatus, in particular a computed tomography, CT, scanner.

In another aspect, there is provided a computer program element, which, when being executed by at least one processing unit, is adapted to cause the processing unit to perform the method.

In another aspect, there is provided a computer readable medium having stored thereon the program element.

"Fault" or "faulty" as used herein refers in particular to any unintended configuration in the circuitry of the detector that may lead to incorrect readings when the detector would be used during imaging (on X-ray exposure). The detector circuity may include in particular circuitry that forms part, or affects, the detector channels (also referred to herein as pixels). The said unintended configuration may include any one or more of: corrupted conductor line(s), shorts, loose contact(s), and other. The corrupted conductor line may include total interruption or intermittent interruption. The unintended configuration may also include malfunctioning electronic components in the circuitry, such as capacitors, photodiode, resistors, or others.

BRIEF DESCRIPTION OF THE DRAWINGS

Exemplary embodiments of the invention will now be described with reference to the following drawings, which are not to scale, wherein.

DETAILED DESCRIPTION OF EMBODIMENTS

Figure 1:
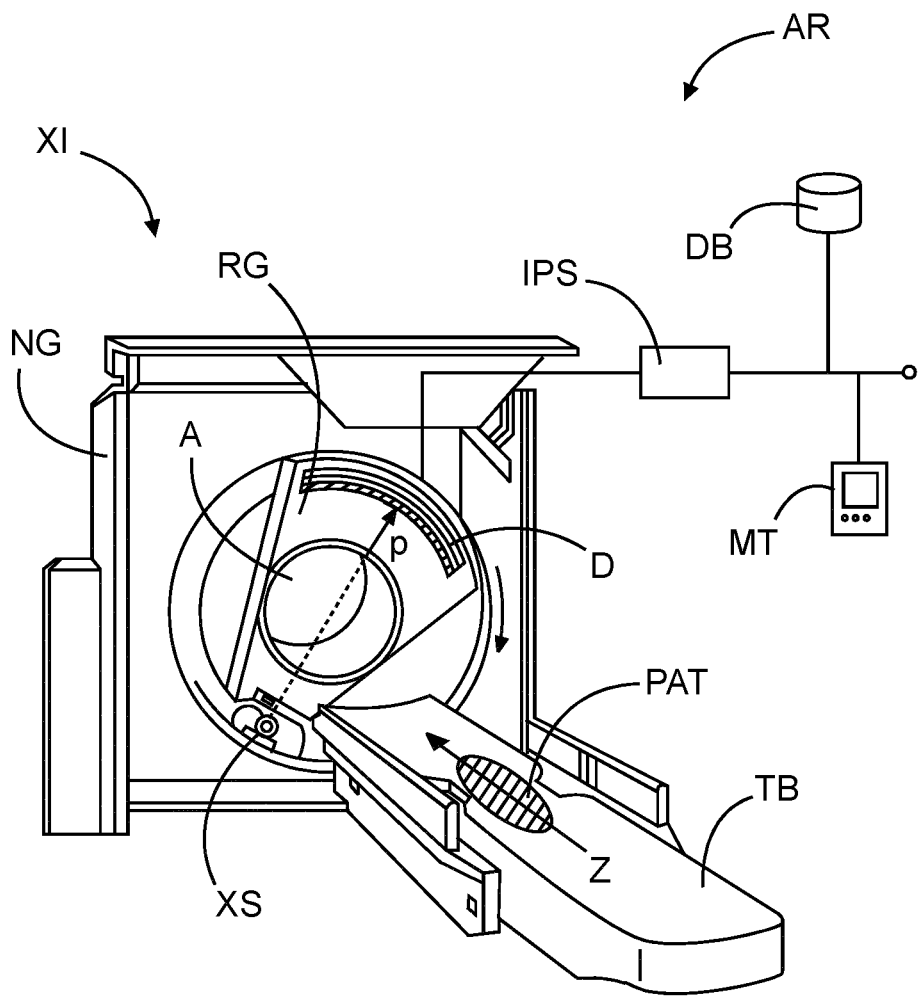
FIG. 1 shows a perspective view of an X-ray imaging apparatus.

With reference to FIG. 1, there is shown a schematic perspective front view of a medical image system XI. The medical image system is preferably an X-ray imaging system of the rotatory type such as a CT scanner. Other rotational imaging modalities, such as C- or U-arm X-ray imaging apparatuses, or a mammography apparatus are also envisaged herein. Non-rotational imagers such as a radiography apparatus is also envisaged. In short, any type of X-ray imager is envisaged herein, and the continued reference to a CT scanner type imager XI is an exemplary embodiment and in no way limiting the present disclosure.

In particular, but not only, CT type imagers XI may comprise a stationary gantry NG set-up in an examination room. The stationary gantry NG carries a rotational gantry RG rotatable around an examination region A with rotation axis Z passing therethrough. The rotational gantry is donut-shaped and the examination region A is formed as an opening therein. An examination table TB can be made to at last partly extend into the examination region along the rotation axis Z which may also be referred to herein as the imaging axis Z. A patient PAT, or an object to be imaged, resides on the examination table. The table TB with the patient PAT thereon may be advanced along imaging axis Z so that a region of interest comes to lie in the examination region A. The examination table TB is optional.

The rotational gantry includes a detector module D that is capable of detecting x-radiation. The rotational gantry RG may further include an X-ray source XS. The source XS may be arranged on the rotational gantry RG in opposed spatial relationship to the detector D and across the examination region A.

During imaging, X-radiation emanates from the X-ray source XS and interacts with patient tissue, then emerges from the patient's far end, to then impinge on the detector D. The impinged radiation is converted by the detector D into (projection) measurement data (sometimes referred to as detector raw data). The measurement data collected at the detector D may represent intensity values. As envisaged herein, the imager XI includes a fault checker FS that is configured to detect a fault in the detector module D. The fault checker is configured to operate whilst the imager XI is in an idle state outside imaging, that, whilst there is no X-radiation received that the detector. In particular, the X-ray source XS may be off whilst the fault checker FS operates. Operation of the faulty checker FS will be explained more fully below at FIGS. 2-6.

With continued reference to FIG. 1, during imaging, the rotational gantry rotates and with it the detector and in embodiments also the X-ray source. Due to the rotation, the measurement data can be acquired from preferably a multitude of different spatial directions p relative to the patient. In some imaging protocols, the table TB advances along the imaging axis Z to collect measurement data at different locations. An image plane (or "image domain") in which image data is re-constructible from the measurement data is schematically indicated by directions X,Y, each image plane being perpendicular to the imaging axis Z. There are different such parallel image planes, one for each location on the Z axis. An external or on-board power supply (not shown) supplies power to rotational gantry RG (and/or components thereon) via a slip-ring arrangement. An operator console (not shown) may allow a user (such a medical personnel) to control the imaging operation. The user may use the operator console to issue imaging control signals such as X-ray source settings, detector settings, or signals that control speed of the rotation, movement of the table TB, etc.

The measurement data may be forwarded through a wireless or wired communication arrangement to an image processing system IPS. The image processing system IPS may be arranged as computer system that runs imaging software such as an image reconstruction algorithm that allows converting the (projection) measurement data from the projection domain into cross sectional imagery in the image domain X,Y. A preferably multitude of cross sectional imagery may be obtained along the imaging axis Z which can be assembled into a 3D image volume. Other tasks may be performed by the image processing system IPS. The image processing system IPS may reside on a single or a plurality of computers such as in a "Cloud" setting or other distributed architectures. Instead of, or in addition of providing the measurement data to the image processing system IPS, the measurement data may be forwarded for storage to a database DB (such as a PACS of a HIS) or other memory. The reconstructed imagery or the measurement data may be visualized on a display device MT or may be otherwise processed.

Before turning to the proposed fault tracker system FC in more detail, reference is first made to FIG. 2 to explain operation of the X-ray detector module D.

Figure 2A:
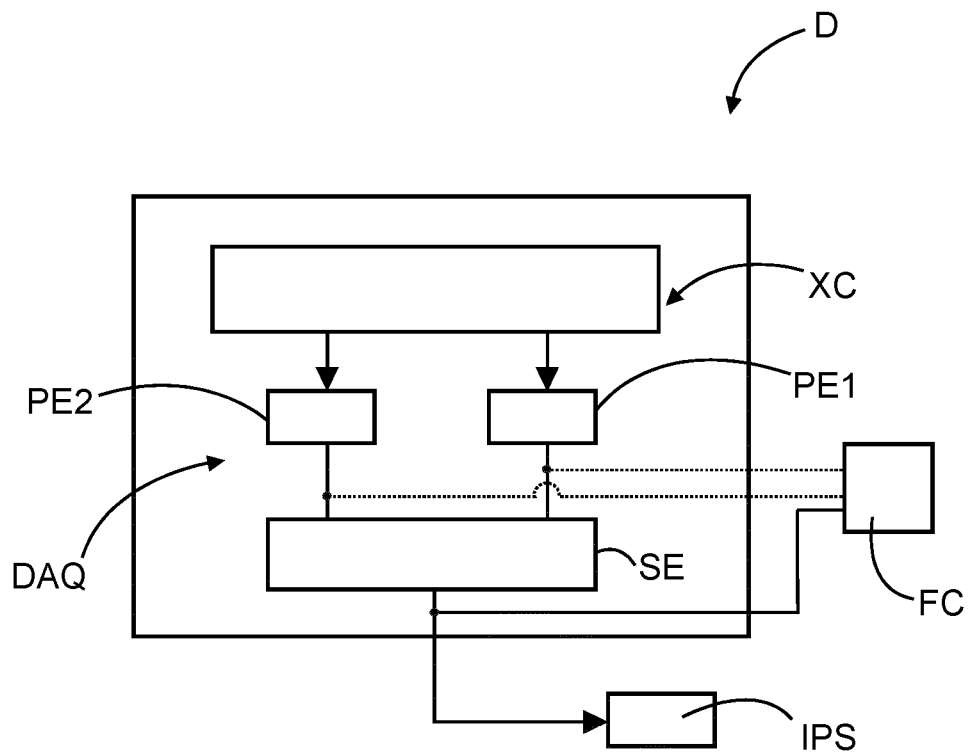
FIG. 2A shows a schematic block diagram an X-ray detector module.
Figure 2B:
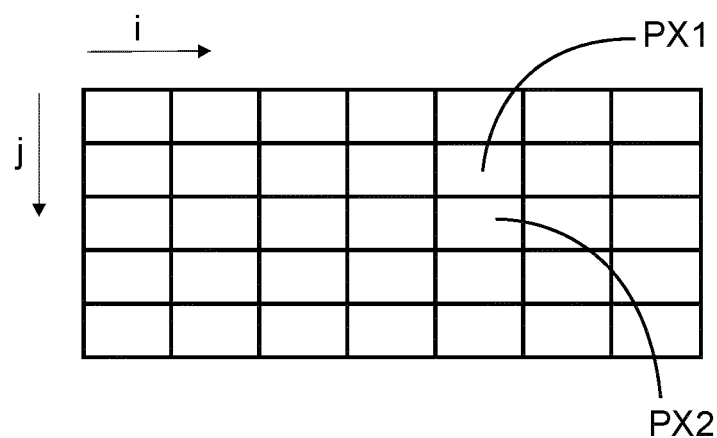
FIG. 2B shows an enlarged plan view of a two dimensional X-ray detector module.

FIG. 2A is a schematic block diagram of the detector module D whilst FIG. 2B furnishes a plan view (enlarged for illustration purposes) on the detector module D when viewed from the source XS along a projection direction p.

Referring first FIG. 2A, the detector module includes a data acquisition unit DAQ. The basic function of the data acquisition unit DAQ is to convert the incoming x-radiation into electrical signals that represent X-ray photon energy. The electrical signals can be converted by analogue-to-digital (A/D)-circuitry into numbers which can then be processed by the image processing system IPS into imagery in image domain for visualization for example.

The data acquisition unit DAQ of the detector D includes a transducer section XC where X-ray photons are converted into electrical signals. The transducer section XC may be structured into a number of spatially arranged pixel elements PX1, PX2. An example of a 2D pixel matrix layout with i columns and j rows is shown in plan view in FIG. 2B. The view is along the projection direction p which extends into the drawing plane of FIG. 2B. 1D layouts are also envisaged in some imaging modalities such as in mammography imagers of the slot scan type for example.

Each of the pixels PX1,PX2 is associated and coupled to respective pixel electronics PE1, PR2. Only two pixels PX1,PX2 are shown for illustration. For example, in some CT scanner detectors, the number of such pixels runs into the order of about $10^5$. The pixel electronics PE1, PE2 form read-out circuitry that provide the electrical signals in the analogue domain through read-out lines to a shared electronic circuitry SE. Each pixel has its own read-out line. The electrical signals, a voltage or a current, is provided through the read-out lines as individual detector pixel readings, multiple times per unit time. The shared circuitry SE, or other, downstream circuitry, may implement conditioning tasks such as filtering, amplification etc, and includes in particular the A/D circuitry where the analogue signals, usually in voltages, are converted into numbers that can then be processed by the image processor IPS into imagery in the image domain. The output at the shared electronic stage SE forms the above mentioned measurement raw detector data 7E in the projection domain.

The proposed fault checker system FC is envisaged to tap into the circuitry of the data acquisition unit DAQ, in embodiments in the analogue domain as shown by tap points in FIG. 2A. In particular, analogue signals provided by the respective pixel electronics PE1 and PE2 are processed by the fault checker FC to establish whether there is a fault or not. Alternatively or in addition, the fault checker FC may tap into connective circuitry that couples the pixel elements PX1,PX2 in the transducer stage to the respective pixel electronics PE1, PE2. In general, a "pixel" as used herein may refer to each individual assemblage that comprises a certain part of the transducer stage, that is the pixel element, and its associated pixel electronics PE1,PE2 to which the pixel element is coupled. A connection from a given pixel to its read-out line is also referred to herein as a "channel". There are as many channels as there are pixels in a detector D.

In a preferred embodiment, and in addition or in the alternative to the above, the readings are collected by the fault checker not (only) in the analogue domain, but in the digital domain, that is, downstream (after) the A/D circuitry.

With these definitions, it can be said that the fault checker as envisaged herein is configured to find a faulty pixel, and the fault may occur anywhere in the given assemblage or channel. A faulty pixel may be referred to herein as a "bad detector pixel" or "bad pixel BD" or simpler still, as "pixel is BD".

In a preferred embodiment the detector D is of the indirect conversion type where the converter stage XC includes a scintillator layer, usually made from a crystal, or any other suitable material, such as ceramics or garnets. One side of the layer is arranged to face the incoming X-ray photons. Underneath, that is, the other side of the scintillator layer is coupled to an array of photo-diodes PHD, each photodiode preferably associated with the respective pixel positions/elements PX1, PX2 in the scintillator layer. In this embodiment, the scintillator is structured into pixel scintillator elements. The conversion is "indirect" because incoming X-ray photons are first converted into visible light by operation of the scintillator layers and it is photons in the visible spectrum that are then converted into analogue electrical signals by the photodiodes. Unstructured scintillators, such as mono crystals, are also envisaged where there is no such one-on-one correspondence between scintillator elements and pixel electronics PE1, PE2. In this embodiments, the pixel P1,P2 is defined by each of the individual pixel electronics PE1, PE2.

The fault-checking system and associated principles disclosed herein are not confined to indirect conversion type detectors. In particular, direct conversion type detectors are also envisaged herein. In direct conversion detectors, the conversion stage XC is formed from a semi-conducting material crystal such as silicone layer, across which pixel electrodes are mounted as part of the pixel electronics. In other words, electrodes for each pixel comprises an anode and a cathode. A voltage is applied by a power source (not shown) across the semi-conductor crystal. Incoming X-ray photons cause cloud charges to be formed. The cloud charge comprises holes and electrons. The electrons diffuse to the anode whereas the holes diffuse to the cathode thus closing a circuit and an electric signal issues, which then travels along a respective read-out line to the shared electronics SE.

In embodiments, the detector module is compiled from Individual sub-modules, or pixel tiles, rather than, as is shown in FIG. 2B, forming one monolithic structure, which however is also envisaged in other embodiments. Each tile, forms a group of pixels, and each of the pixels in a given tile are generally served by a respective shared electronic circuitry SE.

In general, the shared electronic circuitry SE may be implemented by an ASIC or other circuitry. Read-out lines that run from pixel electronic circuitry PE1,PE2 on a given tile are preferably coupled to the same shared electronic circuitry and the readouts are processed by this shared electronic circuitry.

One failure mode causing channels failures are disconnections between the transducer stage XC that converts the X-ray energy to electrical signals, and the electronic circuit input ports into the pixel electronics PE1,PE2. One effect that is proposed herein to be harnessed in identifying such bad channels is that capacitance at the input of a charge integrating amplifier increases the noise measured by an amplifier output. The transducer stage XC, or an element thereof, adds some capacitance at the input of the amplifier that receives the electrical signals. Discontinuities reduce the capacitance at the amplifier input, and hence such discontinuities may be identified from the reduction of the noise. Alternatively, another failure mode is shorts that may reduce the resistance at the input of the amplifier. Shorts may be identified from increase of noise that they cause.

Figure 3:
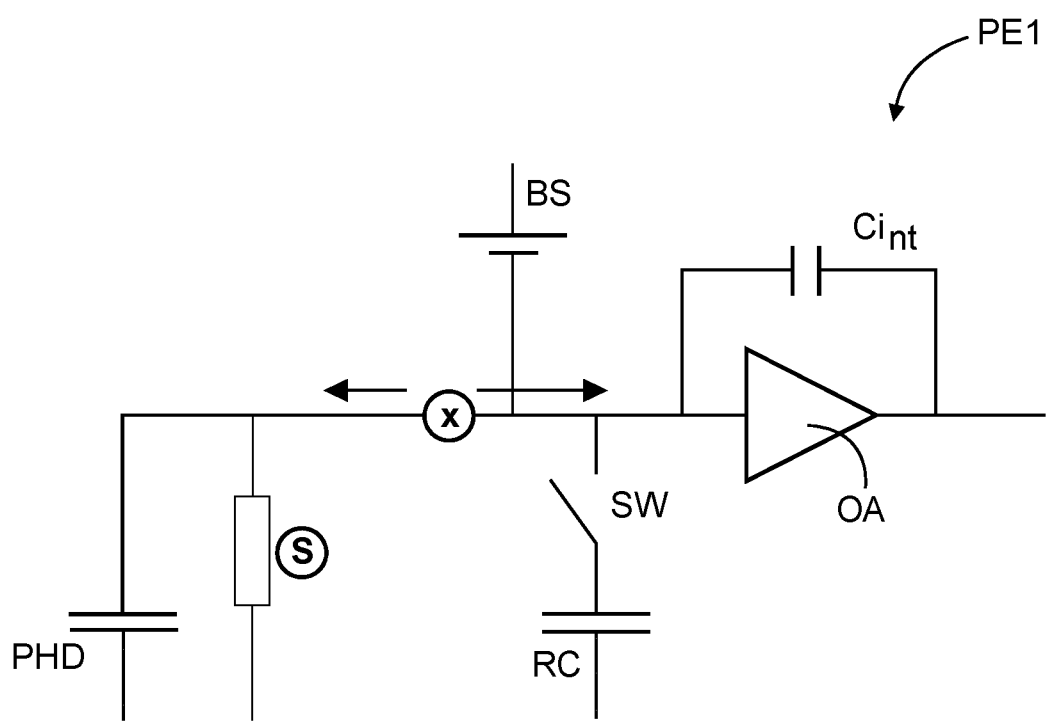
FIG. 3 shows a simplified circuitry diagram of pixel circuitry in an X-ray detector module.

In more detail, and with reference to FIG. 3, this shows a simplified wiring diagram of a part of indirect conversion detection circuitry of the integrating type as envisaged herein in embodiments. The diagram shows an individual pixel circuitry PE1, and also including a part of its associated pixel element PX1. In more detail, the circuit includes, in embodiments, an integrating operational amplifier OA ("OpAmp") and a photodiode PHD as part of pixel element PX1, the other part being a portion of the scintillator layer. The measured value is passed onwards by the OpAmp to a read out line. In embodiments, each pixel j, and hence each pixel electronic circuitry $PE_j$, has its own read out line.

An operation mode of this circuit is as follows. After a reset operation through switch SW, the switch SW is opened to disconnect a reset capacitor RC from the operational amplifier OA to start an integration operation to produce measurement readings. Current from either the photodiode PHD or bias BS flows to the operational amplifier's OA input port. The current discharges an integrating capacitor $C_{int}$ (which was negatively charged). Once integrating capacitor $C_{int}$ is discharged, the operation amplifier OA triggers a new re-charge cycle. Therefore, the number of re-charge cycles per unit time measures the current at OA input, thus producing a (noise) measurement. Specifically, at idle state (no X-ray exposure), the photodiode PHD may be described as a capacitor at the input of the operational amplifier OA. The operational amplifier OA measures the bias current BS by integrating on $C_{int}$. An ideal operational amplifier has infinite input impedance. The photodiode PHD capacity at the input reduces the input impedance and increases the noise of the bias measurement. If the photodiode PHD is disconnected in some channel, the noise of the bias measurement will be lower for this channel. In particular, the scheme implemented by the fault checker FC allows detecting discontinuities at idle state. The location of a discontinuity, such as an interrupted or otherwise compromised connecting line, is shown as a cross "x" in FIG. 3, with arrows to the left and right indicating other possible locations for the failure discontinuity situated between the output of the photo detector PHD and the input of the operation amplifier OA.

Other failure modes include shorts. Shorts, may occur when there is an unintended, abnormal, current path (shown as "S" in FIG. 3), between positive and negative inputs of the operational amplifier OA, which may result in a lowering of impedance between operational amplifier OA inputs. Applicant has observed that presence of shorts is associated with noise decrease. Shorts S may also occur in other parts of the circuity.

Applicant has observed that both failure modes, discontinues and shorts, have unique "noise footprints" that can be detected in noise signal measurements when the detector D is idle (with no X-ray incident from the source XR) to establish whether or not a given pixel is bad. Another failure mode that may be detected herein is a failure within the operational amplifier OA that may result in no output reading at all, and thus zero noise.

Other failure modes may also be detected herein, in the above described examples for failure modes are not exhaustive. Also, it will be understood that the circuitry in FIG. 3 is only for illustration of the various failure modes and the noise patterns they may cause. Variants of the circuitry, and indeed other circuitry, is also envisaged herein, and the wiring diagram in FIG. 3 is not to be read as limiting the principles described herein. However, some embodiments envisaged herein may still include the shown circuitry, or variants thereof, in particular circuit equivalents thereof.

Figure 4:
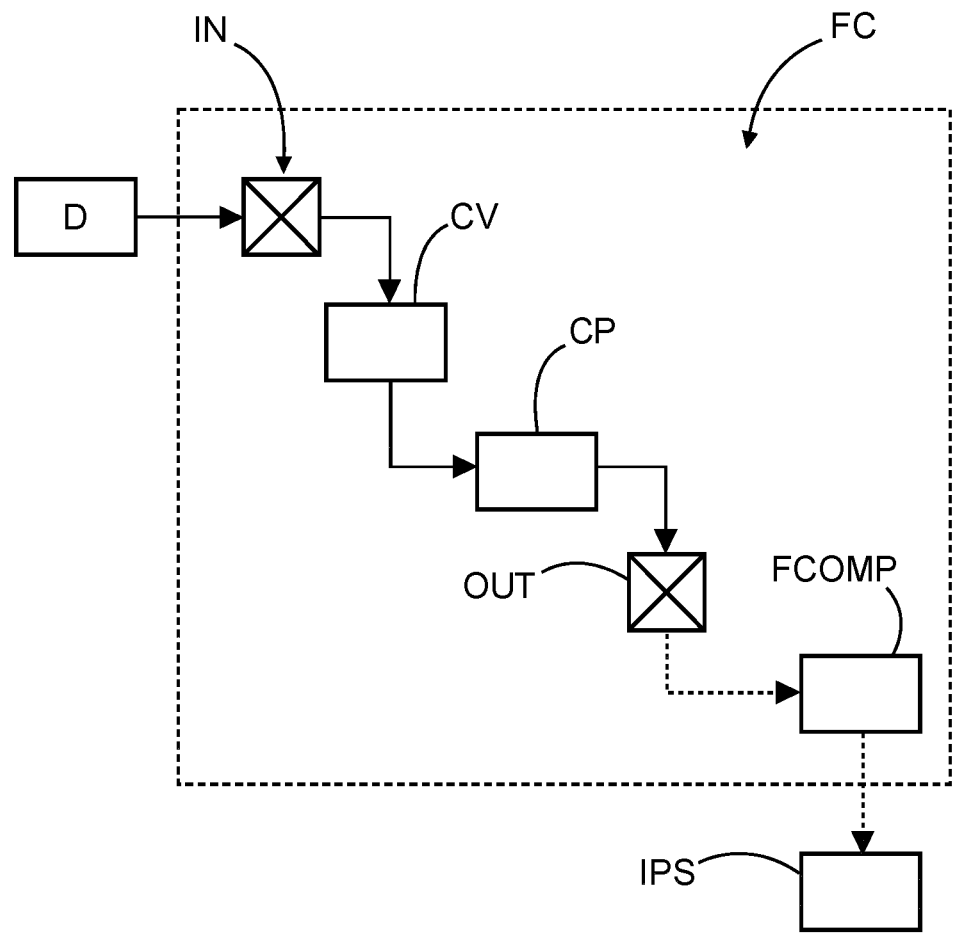
FIG. 4 shows a schematic block diagram of a fault checking system for an X-ray detector module.

Reference is now made to FIG. 4 which shows a schematic block diagram of the fault checker FC as envisaged herein.

The fault checker FC may be fully integrated into the imager XI, in particular into the detector module D itself. The fault checker may be implemented on a single or multiple integrated circuits ("chip"). The fault checker may be implemented on a micro-controller including processing unit storage and other components necessary for processing.

As briefly mentioned above, the fault checker FC, as indicated in FIG. 2A in dotted lines, may tap into the analogue domain circuitry of the detector so is capable of processing analogue signals. In this case the fault checker's input port IN includes, or is coupled to, an analogue/digital converter. In particular, in embodiments, fault checker FC is configured and arranged to collect its input as analog signal (s), in a section of the DAQ circuity downstream (after) the photodiodes PHD, but upstream (before) the DAQ's A/D conversion. However, and as also mentioned above, alternatively and preferably, the fault checker FC receives its input after the detector D's digitalization stage as shown in solid lines in FIG. 2A. In particular, the fault checker FC may obtain its input from the regular output interface into which the pixel readout lines terminate. This may be the same output that supplies the image processor with projection raw data 7E to be reconstructed. In embodiments the fault checker FC is implemented by a suitably programmed processor PU. The processor PU may be dedicated or may programmed to perform other functions also, such as controlling transfer of data to the image processor IPS, or others.

In short, the proposed fault checker FC is configured to operate in analogue or digital domain, but operation in digital domain is preferred. In either case, faults in analog and digital circuitry is detectable with the proposed fault checker FC.

Some detectors D include a section with logarithmic conversion. A logarithmic operation is applied to the output signals after A/D conversion to produce "logged" signals. The proposed fault checker FC is further configured to process logged or unlogged signals when checking for faults.

Broadly, and with continued reference to FIG. 4, input signals, including pixel readings in detector idle state, are received at the input port IN may come from a single pixel or may come from a group of pixels, such as a tile, or from all pixels on the detector arrays, or from other, not necessarily topologically connected groups. Operation of the fault checker proceeds pixel-wisely and produces for each pixel signal processed the respective indication whether the respective pixel is bad or not. This indication per pixel is output at output port OUT. The fault checker may operate in parallel on plural, possibly all or a group of pixels, or may process the pixel readouts in sequence.

The FC may include a digital high-pass-filter (not shown) to be applied to the measured pixel signal to enhance noise. This is because it has been found that a spectral density of noise as associated with capacitance on the input of the amplifier OA in case of discontinuity has strong frequency dependence.

Operation of the fault checker FC includes a convertor CV to convert the pixel reading signals, analogue or digital, into a metric, a number, to be explained more fully below. The metric is then processed by a comparator CP that compares the metric against one or more thresholds TH according to a test policy or uses other text policies. The comparison against one or more threshold may be explicit or implicit. The thresholds may be fixed or may be dynamically changed for each or some pixels over time and/or change from pixel signal to pixel signal for a given pixel. The comparator CP checks whether the thresholds or threshold is violated as per the test policy. Some test policies will be discussed below at FIG. 5.

In embodiments, the comparator CP implements a failure test in terms of one or more thresholds. If the test fails, the respective pixel is considered bad and this is flagged up in a suitable data structure which is then output at port OUT. The per pixel faults BD may be written into a log-file or may be output individually as a suitable coded flag and this is then processed/stored by a receiving party. The log-file may be stored in a memory, either onboard the fault checker FC or in external memory. The log-file may be displayed on a display device MT, or may otherwise be made available. The log file may be transmitted to a recipient, for instance for review by service personnel. The log file may be transmitted by fault checker FC through a suitable communication system.

In embodiments, the fault checker FC further includes a fault compensator FCOMP. The fault compensator FCOMP allows continued operation of the imager even though faulty pixels have been detected. This is so because a mere sporadic fault occurrence up to a certain critical number of faulty pixels still allows safe continued operation of the imaging apparatus. If a pixel is known as bad, its reading can be disregarded and replaced by interpolations from neighboring pixels which were flagged up as good. Fault compensator FCOMP may co-operate with the image processor IPS where the measurement data are re-constructed into imagery. The fault compensation can be conducted in the image domain or can be done in the projection domain. For instance, the measurement data in projection domain collected in an imaging operation can be corrected for bad pixels by interpolation across neighboring measurements and it is the so "patched up" projection data that is then fed into the image processing system for re-construction. Alternatively, the interpolation can be done in image domain by modifying contributions of bad pixels to a given voxel.

So whilst the output can be used to trigger a signal for a service callout, this is not necessary in all circumstances and the proposed FC can ensure continued safe operation despite bad detectors found. Only when the overall number of BD pixels exceed a certain critical threshold or when too many BD pixels accumulate in given region, so that no reliable robust interpolation can be guaranteed, is a service call issued. This can be done by the FC fully automatically by interfacing with a suitable communication system. A message including imager type, location, etc may be send to a service point to request the call-out.

Figure 5:
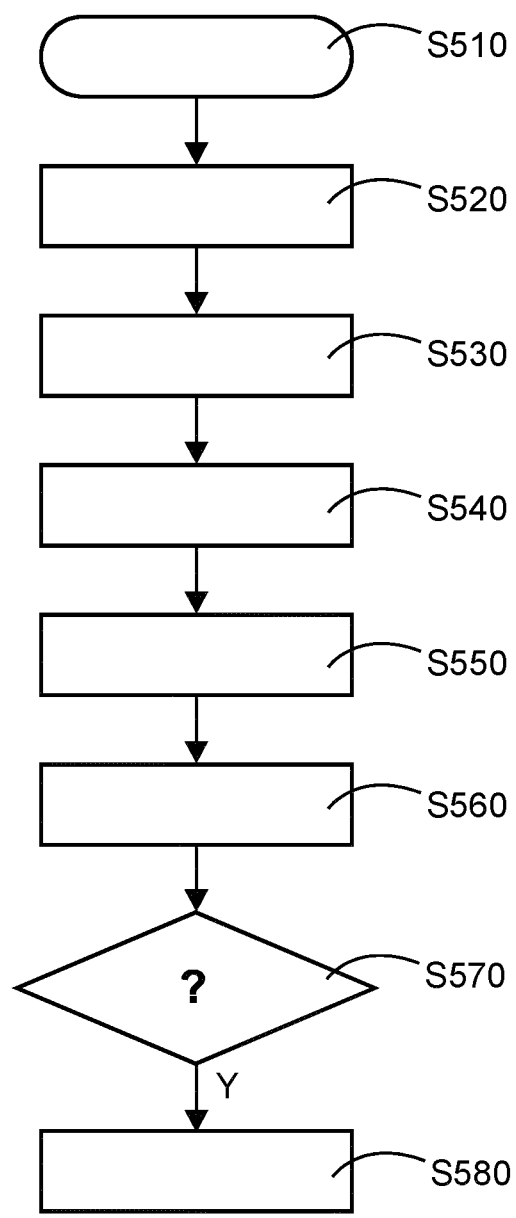
FIG. 5 shows a flow chart for a method of fault checking an X-ray detector.

Reference is now made to FIG. 5 which shows a flow chart of a computer-implemented method for fault checking an X-ray detector. The steps in the flow chart illustrate operation of the fault checker of FIG. 4 in more detail. However, it should be understood that the below described method and its steps constitute a teaching in their own right, and are not necessarily tied to the architecture of FIG. 4.

At step S510 and idle state of the X-ray imager XI is detected. This can be done by an event handler that intercepts a switch signal issued for instance by a user from an operator console associated with the imager XI. The switch signal may have been issued by the user specifically by operating a "check detector" button, or other interface after the X-ray tube has been switched off by the user. In addition or instead, fault checking mode is automatically enabled once the event handler intercepts a switch signal for switching off the X-ray source. Switching off the X-ray source may include interrupting the power supply to the source. However, operating a collimator to block out the X-ray beam may also cause the detection of the imager's XI idle state and may trigger the fault check.

In more detail, the idle state as envisaged herein implies in particular that no x-radiation impinges on the detector pixels (elements) PX1, PX2 to be fault checked, and that no scan is expected for a preset period of time. Preferably the event that triggers fault checking mode is not merely sent when the X-ray is off, as in some imaging protocols, X-ray is switched off and on, or is collimated out several times during the imaging procedure. Preferably then, the fault check triggering event indicates not only X-ray switch off, but in addition that the imager is not in an ongoing imaging procedure and/or that such an imaging procedure is not expected to happen within the said preset time, such as within the next minutes, next half an hour, next hour, or any other suitable off-duty period. This is to ensure not to degrade system performance because of fault checking and parameter reset. There may be a user interface, such as an override button or other, that allows a user to anytime interrupt the fault checking mode and request returning to imaging mode. Alternatively, when imaging mode is requested, the fault checking mode is automatically suspended.

At step S520 detection modes (detection parameters) of the detector are suitably set to now process in idle state. Normally, the detector pixel readings at idle state are not collected or analyzed. However, in the proposed method pixel readings outside the scan time are obtained. Setting the detection modes facilitates noise collection by setting detection parameters to optimized values, that is, to values that facilitate noise measurement collection. In particular, and in embodiments, the detection parameters are set so that noise added by the capacitance of the detecting element, eg photodiode PHD, at the input of the detector channels may be identified from the overall channel noise. The setup is aimed, in some (but not all) embodiments, specifically to make a contribution of noise from the PHD capacitor detectable, compared to the overall noise. Specifically, the setup is aimed to reduce contribution from other noise sources. Yet more specifically, this setup may include any one or more of: setting a gain of the detector channel to be processed, the integration time (for integrating detection). In addition or instead, other detection parameters are adjusted, such as the length of the time period over which the series readings are collected, on which more further below at step S540.

At step S530, analogue or, preferably, digital signals for a given target pixel are measured. The measurements ("readings") include noise measurements as there is no X-ray exposure due to the imager being in idle state. The proposed method will be explained in the following at the example of a certain given target pixel, with the understanding that the method is to be carried out in the same manner on some or all pixels of the whole detector or part thereof, such as some or all pixels on a given detector tile or part thereof, or on any other portion of the detector array. The proposed method may be practiced in parallel for plural pixels, or may be practiced in sequence for some pixels. Even when practiced in parallel, this may include processing different groups of pixels in sequence.

The noise measurements can be obtained in a time series for the target pixel over a period of time at a given frequency. The collection of pixel readings in step S530 at idle state may be implemented by interfacing with existing output ports of DAQ system that are used for the normal scans in busy, on-duty, state. Specifically, the noise readings for any pixels may be obtained in the digital domain as supplied by the read-out circuitries SE. Alternatively, the measurement signals may be collected in the analog domain, further upstream in the pixel electronics PE1 of the target pixel PX. The detector D as envisaged herein is configured such that readings are delivered despite the imager XI being in idle mode, to ensure that data can be collected in step S530 for fault-checking purposes. In other words, whilst the X-ray source may remain switched off during execution of the proposed method, in particular during the measurement collection step S530, the detector itself remains powered on so that the readings can be generated, as explained in FIG. 3 above. Step S530 may be implemented by one or more dedicated chips, such as a microcontroller or microprocessor, embedded in the detector module system D.

At step S540, based on the measurements for the target pixel, a metric is computed. The metric is a suitably chosen statistic or other quantity that captures characteristics of noise fluctuation. In particular, the measurement of the target pixel includes measuring multiple readings at step S530 for the target pixel over a time series of a given length. It is this time series of noise measurements that are then used in step S540 to calculate a statistical metric, such as sums of differences or a standard deviation, the square thereof (variance), or other, higher moments, such as the $3^{rd}$ or $4^{th}$ moments (skewness, kurtosis, respectively), or others still, such as autocorrelation, entropy, mixed moments, a combination or any two or more of the foregoing, or any other suitable quantity, statistical or not. The metric is preferably suitably to quantify fluctuations and/or noise, in particular noise fluctuations.

In embodiments of said metric, the readings of the target pixel channel are collected over time and a statistical standard deviation is calculated. As mentioned earlier in FIG. 4, a digital high-pass-filter may be applied first to enhance noise contribution in the measured pixel readings due to the correlation of frequency and spectral density of noise.

In an optional step S550, the metric is normalized. This may include taking into account readings collected over time at a group of one or more pixels other than the target pixel. The measurement collection for such pixels is the same as described above at step S530. The group may constitute pixels on the same tile, may constitute immediate neighboring pixels or may constitute any other one or more groups elsewhere (more remote) on the detector. The group of pixels may be hence referred to as reference pixels relative to the target pixel. Normalizing the metric for a given target pixel based on using measurements from reference pixels (reference group) allows compensating factors such as the aging of the detector system. Using local, for example neighboring pixels, as the reference group can compensate for local effects. In particular, using as reference group some or all channels that are served by the same shared circuitry SE, eg an ASIC, may allow compensating for changes related to the ASIC's power supply, or the ASIC's local temperature. In general, using as reference group such channels that experience the same conditions as the target channel makes the thresholding more robust.

As mentioned above at step S520, another detection parameter that may adjusted is the length of the period over which pixel readings are collected, and based on which the metric, such as the standard deviation, is computed. The collected pixel readings may be considered outcomes of a random variable. In general, for a random variable, an accuracy of evaluating the standard deviation from measurements improves as the number of readings over time increases. However, a series of readings taken over too long a time period might be affect by low frequency noise that might cause drift, which in turn might change the mean reading of a channel, and interfere with a metric's ability to correctly capture noise. Normalizing the channel noise as done in step S550 by using readings from other channels may be used to compensate for such low frequency drift. Normalization S550 may be used also to compensate for changes in the environment conditions, and for the aging of the detector system D.

In embodiments, the array of detector pixels is made up from groups of pixels such those pixels on a given tile, that share the same electronic circuits SE, such as a single ASIC for A/D conversion. For such groups of channels that are served by the same shared electronics, the same or similar noise characteristics may be expected, and hence one may expect similar values for the noise metric such as mean absolute difference between logged readings or other of the above mentioned metric embodiments. In this case, the normalization S550 may be carried over channels served by to the same ASIC, instead of the using the entire pixel array of the detector module D. In such embodiments, the normalization may be done per group, such as per tile.

At step S560 the test policy is applied. One test policy may include thresholding. At step S560 one or more thresholds are applied against the calculated metric at step S540 or its normalized version as obtained in step S550. Specifically, in embodiments the thresholding may include checking whether the respective quantity/metric for the target pixel PX1 is above or below the threshold. Two or more thresholds may be used to define a range and it is checked whether the metric quantity obtained in steps S540, S550 is within the range or is outside the range.

In step S570, based on the test policy, a decision is reached on whether the target pixel PX1 is BD or not. It will be understood that the test policy will depend on the semantics of the metric, that is on how the noise is measured. For example, in the embodiments mentioned above in relation to the standard deviation as metric, this may be compared versus either a low threshold or a high threshold or both, low and high thresholds. Comparison with low threshold may detect discontinuities at the input of the detecting channels amplifiers. So if the metric values come out under the lower threshold, the target pixel is BD, and good otherwise. If two thresholds are used, may check in addition that the metric is not too high, as this too may indicate BD. Specifically, if the metric come out higher than the high threshold, this may identify shorts at the input of the detecting channels amplifiers, or faults in the amplifier or in other electronics circuits. Similar conclusion may be reached by a metric other than the standard deviation.

In step S580, based on the decision at step S580, the target pixel is flagged up as bad BD or as good ("OK"). This step may include constructing or writing into a suitable data structure such as a table where a pixel identifier entry is associated with the corresponding flag, such as "BD" or "OK", or "1"/"0" or other according to a suitable encoding. Alternately, the list includes only the BD pixel identifiers or only the good pixel identifiers.

There may be a further optional step of checking, based on the data structure, whether a critical number of bad pixels has been reached globally and/or for a certain neighborhood. If yes, an alarm is issued and/or a call out service is requested and the imager is taken off service. If not, the imager is allowed to continue, and interpolation may be used to compensate the bad pixels if the imager exits idle state and (re-)enters regular imaging operation ("duty state") which includes switching back on the X-ray source. It will be understood that the said list (or other data structure, such as a database entry) which records the bad pixels, is maintained during busy state, and is continued written to once the imager retires into idle state again and the method is reapplied.

The method may be executed each time the imager retires into idle state. Alternatively, the method is executed according to a schedule, for example once per hour, day, week etc, when the imager is in idle state, or according to an explicit demand. The method, when executed, determines the status (BD or OK) for each pixel once or more than once. Specifically, in one embodiment the method is executed continuously, at a given frequency such as per second, whilst the imager XI is in idle state. Other periodic, albeit slower, schemes are also envisaged, such as per minute or per hour evaluations, etc, whilst the imager XI is in idle state.

In general, the proposed method may be performed at once for all pixels, or the detector array is processing per portion over time. Specifically, to save processor FC resources, each part of the detector array is checked one after the other in cycles, until the whole array D has been fault-checked. Once pixels in all of the detector have been checked, the checking cycle restarts with (re-)checking pixels in the part of the detector first processed, and so on. If the flow of the fault checking method is interrupted, eg, when a switching out of idle state is requested, once idle state is restored, the method flow will re-start fault checking in the same part of the detector array left before interruption. This fault-checking protocol assures that, over time, the entire detector D will be fault-checked eventually.

It will be understood that the above described processing in parts will depend on the processor capability on which the fault checker is implemented. In embodiments, processing in parallel the entire detector array may be possible and this is indeed preferred. Preferably, the processing manner (in parts or at once, in series or in parallel) and the processing capability of the processor are adjusted and chosen, respectively, so that a complete detector array fault-check can be done within a period less than an average off-duty time between patient imaging in a given clinical site.

Step S540 and step S550 will now be explained in more detail as envisaged in embodiments.

An example implementation may be used for a rectangular detection array comprising 672 by 128 channels, of an integrating type detector. The channels are set to integration time of 300 µS. A number of noise readings are collected, e.g. 4000 of the target channel with no X-ray exposure.

Denoting the $n^{th}$ reading of a channel at the $i^{th}$ detector column and the $j^{th}$ detector row by $x_{i,j,n}$, the standard deviation of x along the readings is calculated.

The standard deviation (of noise) at the $i^{th}$ detector column and the $j^{th}$ detector row may be denoted as $N_{i,j}$. $N_{i,j}$ represents the metric as calculated at step S540 in embodiments and this can be compared against or more thresholds to conclude the pixel is BD or not.

For better robustness it is proposed herein in preferred embodiments to normalize $N_{i,j}$ at step S550 based on readings from a reference group of other channels. In embodiments, readings from all other channels are collected based on forming a quotient of $N_{i,j}$ and medians over rows and columns. Specifically, in embodiments the median of noise along columns is computed and used to normalize:

$$S_{i,j}=N_{i,j}/\text{median}_{along\ index\ i}(N_{i,j}) \qquad (1)$$

In addition, the median along rows of $S_{i,j}$ is computed and the used for normalizing to find the normalized noise as:

$$NN_{i,j}=S_{i,j}/\text{median}_{along\ index\ j}(S_{i,j}) \qquad (2)$$

The following variations in relation to (1), (2) are envisaged in embodiments: the medians may not need to be collected over all rows or over all columns, so i and j may be restricted, to cover for instance only pixels for a given tile or any other group. In embodiments, only the four or eight immediate neighbors in the matrix layout FIG. 2B are considered for normalization, or a slightly larger group, such as the a square of given edge length that includes the target pixel in its center, etc. Other neighborhood geometries are also envisaged. In further alternative embodiments, only column medians or only row medians are considered in embodiments instead of row and column medians as in (2). Normalizations based on quantities other than medians may be used in (1), (2), such as averages, weighted averages, percentiles, etc.

In alternative embodiments, instead of using the standard deviation $N_{i,j}$ over readings over time, a high-pass-filter is applied, for instance, by calculating, as a metric, the standard deviation of the of neighboring differences ($x_{i,j,n}-x_{i,j,n-1}$).

The normalized noise metric such as (1) or (2) or other metrics may be compared in S560 against one threshold or multiple thresholds. The value of a (lower) threshold may depend on the expected contribution of the capacitance of the detecting element PHD to the overall noise. A typical value may be 0.85. A higher threshold may be applied as well. If for instance, it is found that the noise in a functioning channel group is within 0.85 to 1.2 times the median noise (or other average) of the pixels in the group, a high threshold value of 1.5 times the median noise of the pixels in the group may be set.

The above described embodiments (1),(2) of computing S540 the noise measuring metric and/or the normalization step S550 can be refined to consume less memory and/or to be applicable also for the processing of logged signals.

Storing the required number of readings per channel e.g. 4000 readings per channel, for calculating the noise as per (1) or (2) for example, may pose substantial demands on the system memory. It is desired to use an algorithm that allows accumulating data from multiple readings without significant increase in the required memory. Another consideration is that in some systems, the digital output from the CT detectors is the logarithm of the signal. It is advantageous to use an algorithm that is capable to use as input either the (unlogged) signal or the logged signal.

An alternative to (1), (2) is described in the following that allows accumulating data from multiple readings for memory savings, and may accept with similar performance, either unlogged signals or the logged signals.

As above in (1), (2), an example implementation may be used for a rectangular detection array comprising 672 by 128 channels, of integrating type detectors. The channels may be set to integration time of 3000 or other.

A number Q of readings is collected in step S530, e.g. Q=4001 of the target channel with no X-ray. Denoting the log of the $n^{th}$ reading of a channel at the $i^{th}$ detector column and the $j^{th}$ detector row by $Lx_{i,j,n}$, the sum of the absolute value of difference between successive readings is calculated. The sum of Q−1 absolute differences at the $i^{th}$ detector column and the $j^{th}$ detector row may then be written for this new metric as:

$$s_{i,j} = \Sigma_{n=1}^{Q-1} \text{abs}(Lx_{i,j,n} - Lx_{i,j,n-1}) \quad (3)$$

In the normalization step S550, one may calculate the median of sum along columns and normalize as:

$$S_{i,j} = s_{i,j}/\text{median}_{\text{along index } i}(s_{i,j}) \quad (4)$$

In addition or instead, one may calculate the median along rows of $S_{i,j}$ and normalize to find the normalized noise metric for this embodiment as:

$$NN_{i,j} = S_{i,j}/\text{median}_{\text{along index } j}(S_{i,j}) \quad (5)$$

It will be appreciated that for the calculations (4),(5), one may use as input the log of the signal but may instead use the (unlogged) signal. In addition, accumulating readings by summation now requires only one memory cell per channel, and one may use a single readings counter common for all channels accumulated, as opposed to retaining n time m memory cells (m being the number of readings for each of n channels) as may be required for (1),(2). The configuration (3)-(5) may significantly reduce the required memory and calculation complexity compared to calculating the noise as per (1) or (2). Again, in (4),(5), a quantity other than the median may be used, eg other averages, possibly weighted, or others still.

In embodiments, the summation operation in (1)-(5) is performed in parts by the fault checker FC, and in parts by the common detector circuitry SE or other detector D circuitry. The processor FC may receive a partial sum from the detector D circuitry as required by (1)-(5). This "outsourcing" in parts, reduces the data volume to be transferred from the detector D to the processor FC, and the load on processor FC. Alternatively, all summation work is done either by the detector D electronics or is done by the fault checker FC.

Instead of forming the sum of differences in (5), one may also form a weighted sum of said differences, with a respective weight $w_i$ multiplied with each or some of the summands in (4),(5). In this manner, same readings may be given more weight than others, to so account for changes in the environment whilst the readings are taken for example.

The thresholding at S560 is as described above for (1) and (2): the normalized sum (5) is compared against one threshold or multiple thresholds. The value of the lower threshold may depend on the expected contribution of the capacitance of the detecting element to the overall noise. Again, a typical value may be 0.85. High threshold may be applied as well. The above mentioned variations in relation to (1), (2), are of equal application to (3)-(5).

As to the one or more thresholds at step S570, this/these may be pre-defined and calculated from design parameters of the detector D, such as characteristics of the photodiodes PHD and/or for the amplifier OA, or of any other relevant electronic component, depending on the type of fault one wishes to check for. Alternatively, the thresholds may be determined experimentally. As mentioned above, a value of less than 1 but greater 0.5, such as 0.8, 0.85, 0.9 may be used for some detectors. Multiple thresholds can help identify multiple root causes or failure modes, e.g. value below 0.85 points to a discontinuity at the photodiode PHD, while a value below 0.5 points to a failure in operational amplifier OA. The threshold values may be fault specific. It will be understood that the specific values referred to herein are exemplary, and other values are also envisaged herein, although the mentioned values may still be included in embodiments.

Preferably, a dynamic threshold is used. Different threshold adaptation policies may be used. In one embodiment, this is implemented by modifying a given, pre-defined, initial threshold based on an average of the metric for the group of reference pixels. In embodiments, the metric may be the same as used for measuring the noise in step S540, such as sums of absolute successive differences or the over-time standard deviations, etc.

More specifically, in embodiments, the adapted threshold may be set as the current threshold (which may initially be set to the pre-defined one) times the median or other average (possibly weighted) over reference channels of the same metric, such as the sum of absolute differences or the standard deviation. In other words, the threshold(s) may change in general over measurement cycles. However, in other embodiments, the current threshold is only adapted if the metric (such as the sum of absolute differences or the standard deviation) for the given target channel is actually greater than the current threshold value.

In preferred embodiments, the data computed for the normalization can be used to dynamically change the threshold as described, using the same metric. The reference group for the purpose of computing the normalization is the same as the reference group for the purpose of adapting the threshold. However, this is not necessarily so in all embodiments, where the groups may differ for the two purposes.

As an alternative to adapting the threshold(s) in each measurement cycle S530, the threshold is fixed once and is then maintained. Alternately, the threshold is adapted periodically, e,g, when the imager XI is powered on or according to other schedules, once per hour, once per week, etc.

It should be understood that the above described method/algorithm can be practiced in a number of different embodiments, all envisaged herein. Such embodiments may include different acquisition schemes of the data, e.g. collect the data only from a part of the detector array D at a time as mentioned earlier. Another embodiment that may save memory, is that, instead of storing the complete data from multiple readings, it is only some statistical properties of the data that is stored, such as mean and variance, from the whole or part of the readings per channels. The statistical parameters from two or more groups of readings may be combined together to improve the accuracy of estimating the noise without significantly increasing memory usage.

Also, it will be understood that the threshold decision policies described above, that is, whether a result being over or below a threshold is taken to indicate the target pixel being considered faulty, will depend on the manner in which the metric is computed, on the type and semantic of the metric, and possibly on other design factors.

Whilst in the above processing of the noise readings was described for the time domain, in some embodiments the processing is done in frequency domain. The noise measurements are first Fourier-, Laplace- or Wavelet-transformed into frequency signals in a spectral diagram, and the frequency signals may then be processed similar to what has been described above by computing a suitable metric that can capture fault related time domain fluctuations in frequency domain, or that can capture fault-specific noise footprints in frequency domain. However, the fault check analysis in time domain as described herein is preferred.

Figure 6:
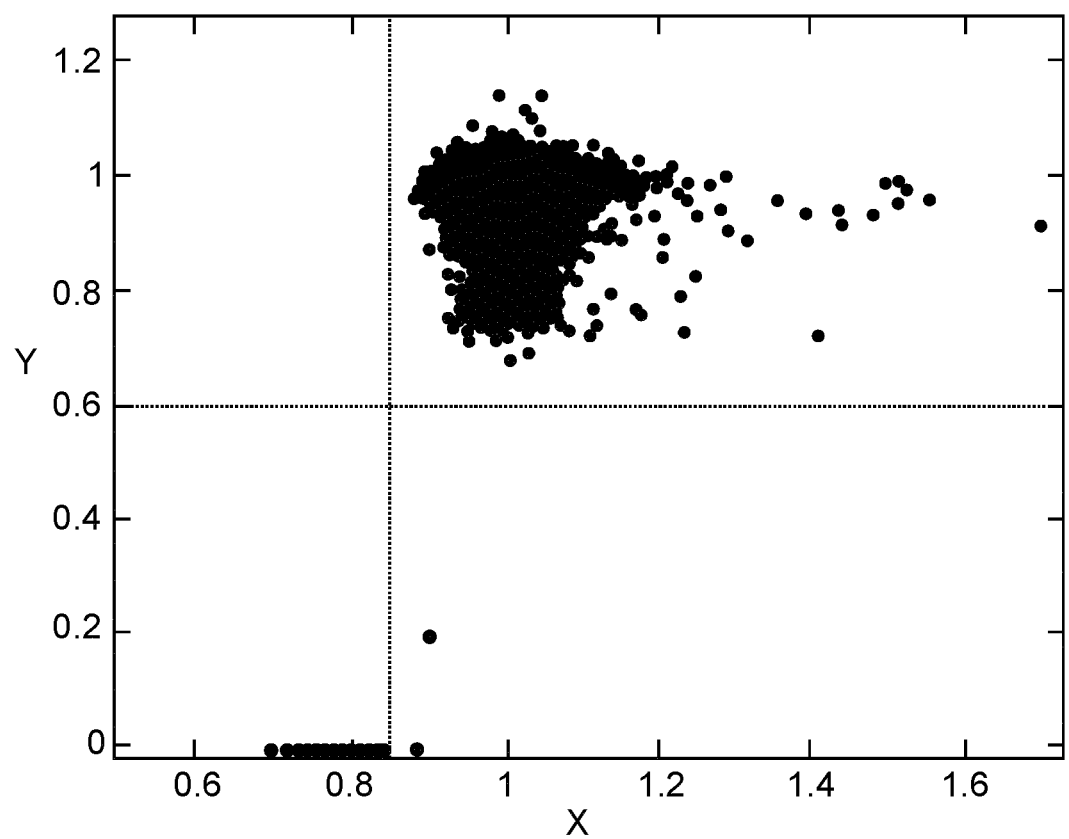
FIG. 6 shows a plot to illustrate exemplary measurement data collected by an X-ray detector and processed according to the method in FIG. 5.

Reference is now made to FIG. 6 which shows a plot of a point cloud in a two dimensional coordinate system. The plot FIG. 6 demonstrates the efficiency of the proposed method. The normalized noise was calculated as described above. In addition, signals Y with X-ray on were measured and normalized. Note that the signal measurement with X-ray on, as recoded on Y the axis is shown only for illustration purposes and is not usually needed when the method is applied. Each channel in the detector array is represented by a point in FIG. 6. The X-coordinate of the point corresponds to the normalized noise of the channel and the Y-coordinate corresponds to the channel signal with X-ray. The vertical dashed line corresponds to a normalized noise threshold value of 0.85. The horizontal dashed line corresponds to an arbitrary threshold for "low signal" set for the normalized signal of 0.6. It can be seen that most of the channels having low normalized signal (below 0.6) are also below (on the left of) the normalized signal. Hence it is possible with a high success rate to find most of the low signal channels, that is, BD pixels, from measuring the noise as proposed herein. And this high success rate can still be achieved without X-ray exposure. It can be seen that only two low signals channels are missed. These two low signal channels may result from other faults types than discontinuities at the input of the channel amplifier or shorts. However, identifying such "rogue" faults and setting the threshold and choosing a metric accordingly may result improve fault detection success rate even furthers still.

The components of the fault checker FS may be implemented as one or more software modules, run on a general purpose computing unit PU such as a workstation associated with the imager XI, or on a server computer associated with one or a group of imagers arranged in a distributed architecture and connectable in a suitable communication network. Alternatively, some or all components may be arranged in hardware such as a suitably programmed microcontroller or microprocessor, such an FPGA (field-programmable-gate-array) or as a hardwired IC chip, an application specific integrated circuitry (ASIC), integrated into the detector module D or otherwise integrated into the imaging system XI. In a further embodiment still, the fault checker may be implemented in both, partly in software and partly in hardware. One or more features described herein can be configured or implemented as or with circuitry encoded within a computer-readable medium, and/or combinations thereof. Circuitry may include discrete and/or integrated circuitry, a system-on-a-chip (SOC), and combinations thereof, a machine, a computer system, a processor and memory, a computer program.

In another exemplary embodiment of the present invention, a computer program or a computer program element is provided that is characterized by being adapted to execute the method steps of the method according to one of the preceding embodiments, on an appropriate system.

The computer program element might therefore be stored on a computer unit, which might also be part of an embodiment of the present invention. This computing unit may be adapted to perform or induce a performing of the steps of the method described above. Moreover, it may be adapted to operate the components of the above-described apparatus. The computing unit can be adapted to operate automatically and/or to execute the orders of a user. A computer program may be loaded into a working memory of a data processor. The data processor may thus be equipped to carry out the method of the invention.

This exemplary embodiment of the invention covers both, a computer program that right from the beginning uses the invention and a computer program that by means of an up-date turns an existing program into a program that uses the invention.

Further on, the computer program element might be able to provide all necessary steps to fulfill the procedure of an exemplary embodiment of the method as described above.

According to a further exemplary embodiment of the present invention, a computer readable medium, such as a CD-ROM, is presented wherein the computer readable medium has a computer program element stored on it which computer program element is described by the preceding section.

A computer program may be stored and/or distributed on a suitable medium (in particular, but not necessarily, a non-transitory medium), such as an optical storage medium or a solid-state medium supplied together with or as part of other hardware, but may also be distributed in other forms, such as via the internet or other wired or wireless telecommunication systems.

However, the computer program may also be presented over a network like the World Wide Web and can be downloaded into the working memory of a data processor from such a network. According to a further exemplary embodiment of the present invention, a medium for making a computer program element available for downloading is provided, which computer program element is arranged to perform a method according to one of the previously described embodiments of the invention.

It has to be noted that embodiments of the invention are described with reference to different subject matters. In particular, some embodiments are described with reference to method type claims whereas other embodiments are described with reference to the device type claims. However, a person skilled in the art will gather from the above and the following description that, unless otherwise notified, in addition to any combination of features belonging to one type of subject matter also any combination between features relating to different subject matters is considered to be disclosed with this application. However, all features can be combined providing synergetic effects that are more than the simple summation of the features.

While the invention has been illustrated and described in detail in the drawings and foregoing description, such illustration and description are to be considered illustrative or exemplary and not restrictive. The invention is not limited to the disclosed embodiments. Other variations to the disclosed embodiments can be understood and effected by those skilled in the art in practicing a claimed invention, from a study of the drawings, the disclosure, and the dependent claims.

In the claims, the word "comprising" does not exclude other elements or steps, and the indefinite article "a" or "an" does not exclude a plurality. A single processor or other unit may fulfill the functions of several items re-cited in the claims. The mere fact that certain measures are re-cited in mutually different dependent claims does not indicate that a combination of these measures cannot be used to advantage. Any reference signs in the claims should not be construed as limiting the scope.

The invention claimed is:

1. A fault checker system for an X-ray detector, comprising:
   an input interface for receiving readings acquired by a target detector pixel not exposed to X-radiation;
   a converter configured to perform a conversion operation to convert the readings into a metric; and
   a thresholder configured to compare the metric against at least one threshold and, based on the comparing, configured to provide an indication whether the target detector pixel is faulty, wherein the metric is configured to capture noise fluctuation, and wherein the at least one threshold is dynamically adapted.

2. The system of claim 1, wherein the performing of the conversion operation by the converter includes the converter performing a normalization operation applied to the readings.

3. The system of claim 2, wherein the normalization operation relates readings from a group of one or more pixels, to the readings acquired by the target pixel.

4. The system of claim 3, wherein the group of pixels neighbor the target pixel.

5. The system of claim 2, wherein the normalization operation includes forming spatial medians for readings in a group of one or more pixels.

6. The system of claim 1, wherein the metric is configured to quantify a fluctuation in the acquired readings.

7. The system of claim 1, wherein the metric includes i) an estimate of an over-time standard deviation, and/or ii) a sum of absolute differences.

8. The system of claim 1, wherein the target pixel is included in a detector tile, and wherein neighboring pixels are restricted to the detector tile.

9. A method of fault checking an X-ray detector, comprising:
   receiving readings acquired by a target detector pixel not exposed to X-radiation;
   converting the readings into a metric; and
   comparing the metric against at least one threshold, and, based on the comparing, providing an indication whether the target detector pixel is faulty, wherein the metric is configured to capture noise fluctuation, and wherein the at least one threshold is dynamically adapted.

10. A non-transitory computer-readable medium for storing executable instructions, which cause a method to be performed to fault check an X-ray detector, the method comprising:
    receiving readings acquired by a target detector pixel not exposed to X-radiation;
    converting the readings into a metric; and
    comparing the metric against at least one threshold and, based on the comparing, providing an indication-on whether the target detector pixel is faulty, wherein the metric is configured to capture noise fluctuation, and wherein the at least one threshold is dynamically adapted.

* * * * *